United States Patent Office 3,378,743
Patented Apr. 16, 1968

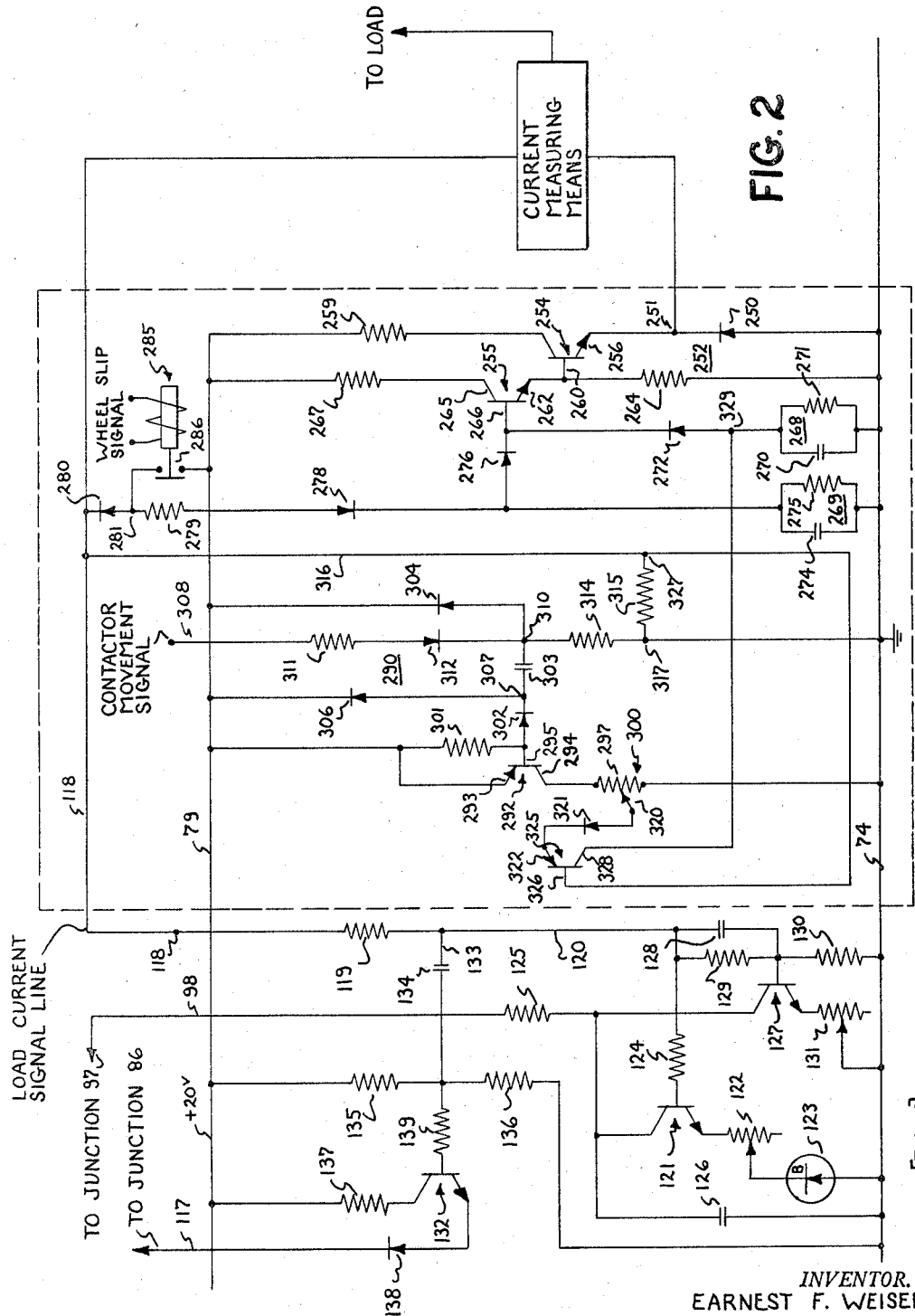

3,378,743
CURRENT REGULATOR FOR MOTOR CONTROL SYSTEMS INCLUDING AN OPEN LOOP SIGNAL WHICH IS COMBINED WITH A CURRENT FEEDBACK SIGNAL UPON OCCURRENCE OF AN EVENT
Earnest F. Weiser, Erie, Pa., assignor to General Electric Company, a corporation of New York
Filed Feb. 26, 1965, Ser. No. 435,647
9 Claims. (Cl. 318—52)

ABSTRACT OF THE DISCLOSURE

A control circuit for causing a current regulator in a motor control system to provide a predetermined degree of regulation upon the occurrence of some event, such as a wheel slip or the addition of a step-like increase in the voltage applied to a motor armature, regardless of the level of the motor current at the time of this occurrence. The control circuit causes an open loop signal to be developed which, when added to a signal proportional to the motor current, comprises a feedback signal of preselected magnitude that produces the predetermined degree of regulation. After the occurrence of the event, the open loop signal decays at a controlled rate which limits the maximum rate at which the motor current can be increased due to the action of the current regulator itself.

---

Figure 1:
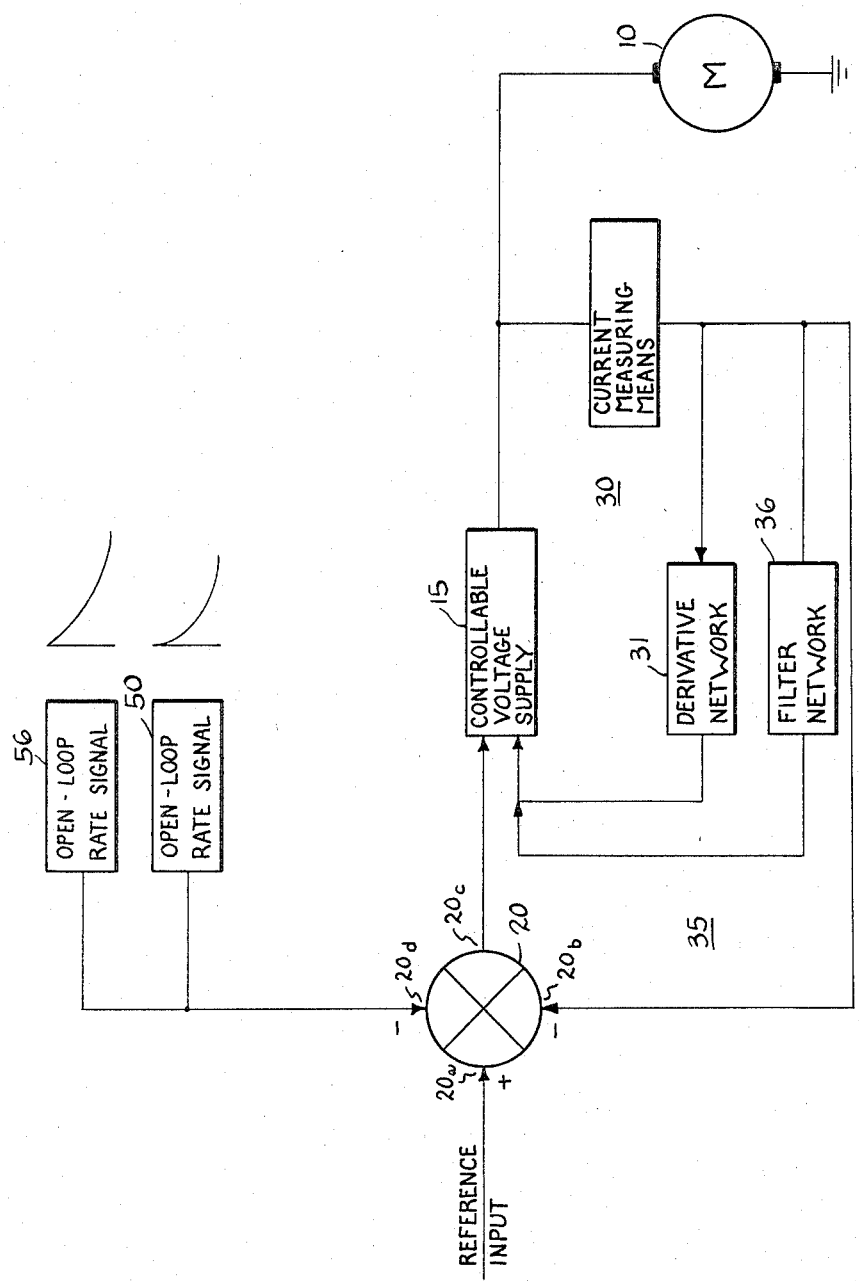

This invention relates to motor control systems and more particularly to an improved current regulator control arrangement therefor which provides for smoother control of changes in load current. More specifically, the arrangement is capable of providing for load current increase from a lower level to a maximum regulated level at a controlled rate. While not limited thereto, this invention is especially applicable to control systems for supplying power from a fixed voltage power source to the armature circuit of one or more D-C series field motors. Accordingly, the invention is applicable to motor control systems of the type described in my copending application, now United States Patent 3,257,597, and a particular embodiment of this invention will, therefore, be described in detail in connection with that system.

In the motor control system of my copending application, the D-C series field motors are supplied with regulated current, at one level, by varying their voltage supply. Acceleration is made at regulated current until full voltage is reached and then continues on fixed voltage and decreasing current on the series motor characteristic.

Because of the phase shift produced by the many lags in control systems of this type, some compensating phase lead may be provided in order to achieve stable closed-loop operation. Such stabilization may be conveniently provided by the addition of a derivative network which introduces a lead, or rate response. Ideally, such a derivative network would assure that the system responds to the rate of change of the controlled parameter as well as prevent undesirably high rates of change as well as prevent unstable oscillation or hunting. In addition, for one reason or another, the controlled parameter, such as the motor current for example, often contains a relatively high ripple content which must be filtered, thereby introducing an even further lag into the system. This imposes even further requirements on the lead system.

Accordingly, to assure that the motor control system responds rapidly and smoothly in spite of the lag introduced by the filter network the system of my copending application also included means for establishing a maximum time rate of increase of applied motor voltage. This was implemented in that copending application, for example, by an arrangement for scheduling a miximum time rate of advance of the firing of the phase controlled impedance means of the system.

Accordingly, although the motor control system of my copending application is entirely satisfactory and capable of providing for smooth and rapid control under all conditions of operation and for a wide range of applications, it is desirable that further developments be made. For example, for some applications it may be convenient, or desirable, to provide different means of achieving and implementing the maximum rate of change of motor current.

It is an object of this invention, therefore, to provide a current regulator control for a motor control system which is operative to maintain the signal input to the current regulator means thereof within its regulation band regardless of the magnitude of the motor current at any particular time.

Briefly stated, in accordance with one aspect of this invention, a current regulator control arrangement is provided for a motor control system of the type wherein motor current is regulated at a given level by varying the voltage output of a controllable voltage supply, the voltage limits of which are changed as a step function. The current regulator control is provided with means which are responsive to the occurrence of an event, such as a step function change in voltage limit, for developing an open-loop signal. Means are also provided for summing this open-loop signal with a signal derived from the current drawn by the motor to provide a feedback signal of a preselected magnitude regardless of the magnitude of the motor current signal at the time of the event. The control is further provided with means for reducing the magnitude of the open-loop signal so that when the feedback signal is compared with a reference signal the error signal will be established and maintained within its regulation band regardless of the magnitude of the motor current.

The novel features which I believe characteristic of the invention are set forth with particularity in the appended claims. The invention itself, however, together with further objects and advantages thereof, may best be understood by reference to the accompanying drawing in which:

FIG. 1 is a simplified schematic block diagram of a motor control system incorporating the current regulator control arrangement of this invention; and FIG. 2 is a schematic circuit diagram of an embodiment of the current regulator control of this invention shown interconnected with a portion of the firing control circuit of FIG. 3 of my copending application, now U.S. Patent 3,257,597.

In FIG. 1 there is shown a very simplified schematic block diagram of a motor control system incorporating the current regulator control of this invention. As shown, the armature circuit of a motor 10 is supplied with a regulated current, at a given level, by varying the voltage supplied thereto from a controllable voltage supply 15. Controllable voltage supply 15 is of the type having voltage limits which are changed as a step function and includes a current regulator (not shown) for regulating the motor current to a given level by varying the voltage output of the controllable voltage supply. While not limited thereto this may be conveniently provided by the voltage supply and regulation arrangement of my copending application, now United States Patent 3,257,597 the disclosure of which is intended to be incorporated herein by reference. Moreover, for simplicity as well as a better understanding of the invention, a particular embodiment thereof will be described in detail in connection with a portion of that system.

A reference input signal is connected to one input terminal 20a of a summation means 20. The reference input signal may be provided in any suitable manner, such as for example, by a breakdown diode device.

The system illustrated in FIG. 1 also includes feedback loops 30 and 35. Feedback loop 30 includes a derivative network 31, the output of which is connected to the controllable voltage supply and is operative to stabilize the system. Feedback loop 35 includes a filter network 36, the output of which is connected to the controllable voltage supply. The current measuring means is connected to the input terminal 20b of summation means 20. The output terminal 20c of summation means 20 is connected to controllable voltage supply 15. As described hereinbefore, because of the lag introduced by the filter network 36, means are provided for controlling the maximum time rate of change of motor current in order to avoid undesirable jerks. This was provided in the motor control system of my copending application in a manner described in detail therein and the input to the regulator of controllable voltage supply was operative to control the motor current as described in detail therein.

In accordance with this invention the foregoing control of the rate of change of motor current is provided by a novel current regulator control which, for some applications, may be found to be a more convenient or desirable arrangement.

Accordingly, a motor current regulator control is provided which controls the maximum rate of change of motor current by providing, at the proper time, an open-loop rate signal of proper magnitude so that when this open-loop signal is summed with a signal derived from the motor current, a feedback signal is provided having a preselected magnitude regardless of the magnitude of the motor current signal at the time the two signals are summed.

To this end, an open-loop rate signal source 50 is provided as shown in FIG. 1. The output of rate signal source 50 is connected at the proper time to the input terminal 20d of summation means 20. This open-loop rate signal then sums with the signal derived from the motor current and when compared with the reference input signal provides for a feedback signal of preselected value. Thus, as the open-loop rate signal level decreases at a controlled rate, in accordance with the characteristics thereof, there is an accompanying increase in the motor current to maintain the feedback signal within its regulating band. The rate of increase of motor current, therefore, is controlled by the rate of decrease of the open-loop signal connected to input terminal 20d.

In view of the foregoing description it will be apparent that input terminal 20d provides a convenient input point for the introduction of external signals to cause a change in the motor current. When the control system is employed to control the traction motors of a railway vehicle, for example, one such external signal which may be advantageously employed may be a signal from a wheel-slip detection system. The presence of such a signal, indicating that one or more of the vehicle wheels are slipping, could be utilized to decrease the motor current until such slipping ceases. On cessation of the wheel-slip signal, however, it is desirable that the motor current then increase at a controlled rate to the maximum limited value. This may be accomplished in accord with another aspect of the invention by providing another open-loop rate signal source 55, the output of which is connected to input terminal 20d of summation means 20. As shown, rate signal source 55 is illustrated as producing a signal having a longer time constant than that of rate signal source 50. This is desirable for use as a wheel slip correction means, however, it will be understood that for achieving other desired functions a signal of a different or more complex character may be employed. Moreover, it will be understood that additional open-loop rate signal sources may be employed if desired and that the two shown are for purposes of explanation and example only.

In FIG. 2 there is shown a schematic circuit diagram of the present invention interconnected with a portion of the firing control circuit of the motor control system of my copending application Ser. No. 330,319. To avoid confusion, the components of that portion of the firing control circuit of my copending application, which is included at the left of FIG. 2 and designated by the reference (FIG. 3), are designated herein by the same reference numerals as in the copending application.

As shown, the output of a current measuring means is applied between the load current signal line 118 and a summation means, shown as the diode device 250. The current measuring means is arranged to develop a preselected D-C voltage level (14.8 volts in a particular system for example) when the motor is carrying maximum regulated current.

Also, an open-loop rate signal voltage may be impressed on diode device 250 which open-loop voltage sums with the voltage applied from the current measuring means to provide the signal voltage on line 118.

An open-loop rate signal is applied at the proper time to the junction point 251, between diode device 250 and the output of the current measuring means, by an amplifier 252. Amplifier 252 comprises transistor devices 254 and 255 each having emitter, collector and base electrodes and connected in the emitter follower configuration. To this end, electrode 256 of transistor device 254 is connected to junction point 251 and the collector electrode 257 thereof is connected through resistance 259 to the D-C control voltage supply line 79. The base electrode 260 of transistor 254 is interconnected to the emitter electrode 262 of transistor 255 and, through resistance 264, to the common conductor 74 which is in turn connected to a suitable point of reference potential such as ground. The collector electrode 265 of transistor device 255 is connected to control voltage supply line 79 through resistance 267. Amplifier 252 provides a current gain and produces a voltage at summation diode device 250 which is proportional to the voltage between the base electrode 266 of transistor device 255 and common conductor 74.

The voltage between the base electrode 266 of transistor device 255 and common conductor 74 is provided by an R-C timing circuit. As described hereinbefore with reference to the block diagram of FIG. 1, signals having different time constants may be employed to provide different functions. As shown in FIG. 2, therefore, a first timing circuit 268 is provided to establish the desired rate signal for controlling the rate of rise of motor current when a voltage limit change is scheduled, and a second timing circuit 269 is provided to establish the desired rate signal for use, for example, in a wheel slip correction arrangement.

Timing circuit 268 comprises the parallel combination of capacitance 270 and resistance 271 and is connected between common conductor 74 and base electrode 266 of transistor device 255 through diode device 272. Timing circuit 269 comprises the parallel combination of capacitance 274 and resistance 275 and is similarly connected between common conductor 74 and base electrode 266 by the diode device 276. Base electrode 266 of transistor device 255 is also connected to load current signal line 118 through diode device 278, resistance 279 and oppositely poled diode device 280.

A wheel-slip relay, energized upon receipt of a signal from a wheel-slip detector (not shown), is arranged to connect the control voltage line 79 to load current signal line 118 through contacts 286 and diode device 280. Energization of relay 285, therefore, is operative to raise the voltage of load current signal line 118 to that of control voltage line 79 (+20v.) calling for an immediate reduction in motor current.

A pulse producing means 290 is provided which is arranged to produce a pulse which is operative to charge capacitance 270 of timing circuit 268 to a proper level upon the occurrence of a specified event, namely, the beginning of movement of a contactor indicating that the operator has scheduled a step increase in voltage limit. Pulse producing means 290 includes a transistor device 292 having an emitter electrode 293, a collector electrode 294 and a base electrode 295. Emitter electrode 293 is connected to the D-C control voltage line 79 and collector electrode 294 is connected to the common conductor 74 through the resistance 297 of a potentiometer 300. Base electrode 295 is connected to control voltage line 79 through a resistance 301 and also through the series combination of diode device 302, capacitance 303 and diode device 304. A diode device 306 is connected between the control voltage line 79 and the junction 307 between diode device 302 and capacitance 303. A Contactor Movement Signal conductor 308 is connected to the junction 310 between capacitance 303 and diode device 304 through the series combination of resistance 311 and diode device 312. Junction 310 is also connected through resistances 314 and 315 to a feedback conductor 316 from load current signal line 118; the junction 317 between resistances 314 and 315 being returned to the common conductor 74.

The control system is arranged so that if any contactor closes, as would be the case whenever voltage is applied to the motor, the energization of the contactor coil operates to raise the voltage on Contactor Movement Signal conductor 308 above that of the control voltage supply line 79. For example, in a particular system employing an unregulated D-C voltage supply having a nominal value of about 37.5 volts, closing of a contact would raise the voltage on conductor 308 to between 25–37 volts. The control voltage line 79 is supplied from this same source but regulated, such as by means of a suitable breakdown diode device (not shown), to 20 volts as illustrated in FIG. 2. Accordingly, when a contact closes, capacitance 303 discharges through diode devices 312 and 306 into the control voltage supply line 79. Diode device 304 and resistance 311 prevent capacitance 303 from discharging beyond a desired level.

Through a suitable interlock arrangement on the contactors which may be provided in any suitable manner, actual contactor movement, indicating that the event is about to take place, operates to interrupt the voltage on Contactor Movement Signal conductor 308. With the voltage removed from conductor 308, capacitance 303 begins to recharge through resistance 314 and transistor device 292 increasing the voltage at potentiometer 300. When capacitance 303 has been recharged transistor device 292 is turned "off."

The movable tap 320 of potentiometer 300 is connected through a diode device 321 to the emitter electrode 322 of a transistor device 325. The base electrode 326 of transistor device 325 is connected to the junction 327 between resistance 315 and feedback conductor 316 to provide a base current for transistor device 325. The collector electrode 328 of transistor 325 is connected to the junction 329 between diode device 272 and timing circuit 268 and, through diode device 272, to the base electrode 266 of the transistor 255 of amplifier 252. Potentiometer 300, therefore, provides the forward bias voltage for transistor device 325 and is operative to turn such transistor device "on" thereby causing capacitance 270 of timing circuit 268 to begin to charge. This capacitance voltage is applied through amplifier 252 to the junction 251.

The "on" time of transistor device 325, and hence the voltage level to which capacitance 270 is charged, is controlled by a feedback signal from load current signal line 118. This feedback signal is applied over feedback conductor 316 to the base electrode 326 of transistor device 325. When this feedback signal is of sufficient magnitude that the voltage at base electrode 326 attempts to exceed the voltage applied to the emitter electrode 322 from potentiometer 300, transistor 325 is turned "off." Capacitance 270, therefore, is charged to a level which, when applied to summation diode device 250 by amplifier 252, sums with the output of the current measuring means to provide a signal level at line 118 which may be controlled by the setting of the movable tap 320 of potentiometer 300. Potentiometer 300 is preferably adjusted to provide for a load current signal line voltage slightly above the regulating level regardless of the output of the current measuring means existing when the event occurs, such as the operator scheduling an increased voltage limit. In a particular system, for example, where the center of the regulation band was about 14.8 volts, potentiometer 300 was adjusted to provide a level of about 15.2 volts.

The open-loop rate signal summed at diode device 250 during regulation of load current, therefore, results in raising the level at load current signal line 118 up to, or slightly above, its regulation level thereby causing the output voltage of the controllable voltage supply to be reduced and reducing the motor current so that the motor current signal summed with the open-loop rate signal provides a voltage level at load current signal line 118 which is within the regulation band.

The open-loop rate signal voltage applied at diode device 250 is reduced at a controlled rate, in accordance with the time constant of the timing circuit 268, when transistor 292 is turned "off" which occurs after capacitance 303 has been recharged. The charging time of capacitance 303 is chosen to be long enough to allow transistor device 325 to charge capacitance 270 in timing circuit 268 to any required level to bring signal line 118 up to the preselected level in the manner previously described. This reduction must be accompanied by an increase in the output of the current measuring means (increase in motor current) in order to maintain the sum constant at load current signal line 118. The motor current rate of increase is controlled by the discharge rate of the capacitance of the R-C timing circuit.

The actual regulation of the motor current may be implemented in any suitable manner. Thus, the actual regulation of motor current in response to fluctuations in the level of load current signal line 118 is not a part of the present invention. For a more complete understanding of the invention, however, the load current signal line 118 is shown interconnected to a portion of the firing control circuit of my copending application and the regulation may be achieved in accordance with that control arrangement if desired. As shown, therein, for example, the motor current may be regulated in accordance with the fluctuations in the voltage level of load current signal line 118 by control of the firing angle of the controlled impedance means and/or control of the power contactors in the manner described in detail in that copending application.

The interconnection of the current regulator control with a portion only of the system of my copending application will now be briefly described. The signal appearing at load current signal line 118 is applied through resistance 119 and conductor 120 to a current limiting and lead circuit. Motor current limiting is achieved by the action of a transistor device 121, the emitter electrode of which is connected to common conductor 74 through an adjustable resistance 122 and a breakdown diode device 123; the signal being connected to the base electrode of transistor device 121 through resistance 124. The collector electrode of transistor device 121 is connected to control conductor 98 through resistance 125. Transistor device 121 is thus in a position to control current bleed from junction 97 (indicated, but not shown) and retard the firing of the unijunction transistor device in the firing circuit (not shown).

When the signal at the base electrode of transistor device 121 exceeds a preselected level, determined by the breakdown voltage of breakdown diode 123, the diode 123 breaks down and permits collector to emitter current to flow through transistor device 121. When this occurs current bleed is established from junction 97 through resistance 125, transistor device 121, resistance 122 and breakdown diode device 123 to retard the firing of the unijunction transistor in the firing circuit and thus reduce the voltage applied to the motor. The gain of transistor device 121 is set to the desired level by adjustment of resistance 122. Thus, the maximum current to the motor is limited by the bleed action of transistor device 121 as determined by the breakdown voltage of diode device 123.

The response of transistor device 121 is modified by the filtering action of capacitance 126, which is connected as shown from the emitter electrode of transistor device 121 is to common conductor 74. The action of capacitance 126 in attenuating response at higher frequencies, such as, for example, in the range of the ripple frequency of the load current, is explained in detail in my copending application.

As also described in my copending application, two rate responsive systems are employed. One of these is responsive at rates extending into the ripple frequency range but is introduced into the system in such a manner that its response to the motor current high ripple frequency rate is incapable of producing an unbalanced firing condition of the controlled rectifiers. The other rate response system provides control of the slower rates of change to assure limitation of acceleration and deceleration as required for a desired smooth range of operation.

The slow rate control is accomplished through the introduction of the load current signal of line 118 over conductor 120 into transistor device 127 through a lead network formed of capacitance 128 and resistances 129 and 130 connected as shown. The emitter electrode of transistor device 127 is connected to common conductor 74 through an adjustable resistance 131 to permit gain adjustment.

By reason of the lead network just mentioned, transistor device 127 thus responds to the rate of change of the motor current signal as applied through conductor 120. The output of transistor device 127 is, at the same time, "lagged" or attenuated at the motor current ripple frequency range by the filtering action of capacitance 126. The action of transistor device 127, therefore, is to apply a slow rate response correction by bleeding current from the junction 97 through resistance 125, with the response at the higher rates in the ripple frequency range being attenuated by capacitance 126.

Fast rate control, for system stabilization, is achieved by introducing the motor current signal to transistor device 132 through conductor 133 and a series connected capacitance 134. Steady state voltage at the base electrode of transistor device 132 is established by means of a voltage divider formed of resistances 135 and 136 connected as shown between the control voltage line 79 and common conductor 74. The collector electrode of transistor device 132 is connected to the line 79 through resistance 137. The emitter electrode of transistor device 132 is connected through a diode device 138 and lead 117 to junction 85 (not shown). The input lead or differentiating network to transistor device 132 is formed by resistance 119 and capacitance 134 connected in series to the junction between resistances 135 and 136. The input to transistor device 132 is connected through a base resistance 139.

The actual regulation of the load current in response to fluctuations in the voltage level of load current signal line 118 in its control band is described fully in my copending application and need not to be repeated herein.

For simplification of the description of the operation of the circuit of FIG. 2, assume initially that voltage has been applied to the motor but has been held by the operator at a fixed limit. Assume also that the motor is a series field D-C motor so that operation at such a fixed voltage causes a decrease in motor current on the series motor characteristics. With the current at some level below its maximum limited regulated value, the operator then schedules a step increase in voltage limit.

As described hereinbefore, closing of any contact, such as the contact closure to apply the foregoing described voltage to the motor, caused capacitance 303 of pulse producing means 290 to be discharged to a selected level.

As soon as the contactor begins to move, in response to the operator's request for an increased voltage limit step, an interlock contact opens interrupting the voltage on Contactor Movement Signal conductor 308 causing capacitance 303 to recharge through resistance 314 and transistor device 292 resulting in an increase in voltage at potentiometer 300. This increase in voltage at potentiometer 300, providing a forward bias, is operative to turn transistor device 325 "on." With transistor device 325 conducting, capacitance 270 of timing circuit 268 begins to charge and continues to charge as long as both transistor devices 325 and 292 remain conducting. The level to which capacitance 270 charges is determined by the "on" time of transistor device 292.

The movable tap 320 of potentiometer 300 is adjusted to provide for a voltage thereat which is slightly above the preselected center level of the regulating band of load current signal line 118. Transistor device 325, therefore, conducts and the voltage of capacitance 270 is applied, through diode device 272 and amplifier 252, to the junction 251 and from such junction to summation diode device 250 and load current signal line 118. As the voltage level on load current signal line 118 increases the voltage on the base electrode 326 is correspondingly increased by the feedback signal from load current signal line 118 which is applied over feedback conductor 316. When the base electrode voltage attempts to exceed that of the emitter electrode, as set by the position of the movable tap 320 on potentiometer 300, transistor device 325 is reverse biased and thereby turned "off." It will be apparent, therefore, that the level to which capacitance 270 charges will be substantially the difference between the voltage level at load current signal line 118 at the time the event occurs and the preselected voltage level as established by the setting of potentiometer 300. The voltage on capacitance 270 then sums with the motor current signal to raise the load current signal line level to the desired preselected value.

When this preselected level is reached, transistor device 325 is turned off by the foregoing described feedback action removing the collector voltage from timing circuit 268. The removal of the collector voltage of transistor device 325 from timing circuit 268 causes capacitance 270 to discharge so that the voltage on capacitance 270 is reduced at a controlled rate in accordance with the time constant of the R-C timing circuit. As the voltage on capacitance 270 falls at the controlled rate, the open-loop signal applied to the junction 251 falls accordingly and, since a constant sum at load current signal line 118 must be maintained, this is accompanied by an increase in motor current at a controlled rate. Such a controlled increase in motor current from any low level up to its maximum regulated value prevents any abrupt changes in load current and a smooth transition is achieved.

The wheel-slip correction is provided by an additional circuit means which includes the timing circuit 269 and the wheel slip relay 285. Upon the occurrence of a wheel slip, relay 285 is energized causing contacts 286 to be closed. This causes the load current signal line 118 to be raised to the level of the control voltage line 79 (20 volts) which, by operation of the firing control circuit to which line 118 is connected, causes the controlled rectifiers to be immediately de-fired. If the relay 285 is energized for only a short time such de-firing alone may be sufficient to lower the motor current to a level to correct such slip. If the wheel slip is of longer duration, however, voltage notch-back will take place in the manner described in detail in my copending application.

Also, at the time contacts 286 are closed capacitance 274 of timing circuit 269 begins to charge and the level to which it charges will be determined by the length of time such contacts remain closed. It will also be apparent that short duration slip signals in close succession will operate to increase the charge level on capacitance 274. These short slip signals are in effect integrated by capacitance 274 and the motor current is lowered or "suppressed" accordingly.

After the motor current has been reduced to a low enough level so that wheel slipping no longer occurs, relay 285 is de-energized, contacts 286 are opened and the voltage on capacitance 274 falls at a controlled rate determined by the time constant of the R-C timing circuit 269. The voltage of capacitance 274 is applied through its diode device 276 to the base electrode 266 of transistor device 255 and through amplifier 252 to junction 251. The operation of this open-loop rate signal is the same as that previously described, with the decrease in magnitude of the open-loop rate signal being accompanied by a controlled increase in motor curent until the maximum regulated motor current level is reached.

It will be apparent that since timing circuits 268 and 269 are connected to the base electrode 266 through their respective diode devices 272 and 276 the voltage of the capacitance at the higher level will be applied through amplifier 252 to the junction 251. Also, the diode devices prevent the discharge of the capacitances through the respective adjacent circuit.

There has been described in the foregoing specification a novel arrangement for providing for the maximum time rate of increase of motor current from some lower level to its regulated maximum. It will be understood that the particular embodiment of the invention described in detail in the foregoing specification is exemplary only and that many changes and modifications will occur to those skilled in the art. The appended claims, therefore, are intended to cover all such changes and modifications as fall within the true spirit and scope of the invention.

What I claim as new and desire to secure by Letters Patent of the of the United States is:

1. A control circuit for varying a feedback signal which is an input for a current regulator in a motor control system of the type wherein motor current is regulated at a given level by varying the voltage output of a controllable voltage supply comprising:
    (a) means responsive to the occurrence of an event for developing an open-loop signal;
    (b) means for summing the open-loop signal with a signal derived from the motor current to develop the feedback signal;
    (c) means comparing the feedback signal with a reference signal for raising the level of the feedback signal to a preselected magnitude which causes a predetermined degree of regulation of the motor current regardless of the magnitude of the motor current at the time of the event; and
    (d) means for reducing the magnitude of the open-loop signal at a controlled rate which limits the maximum rate at which the motor current can increase.

2. A control circuit for varying a feedback signal which is an input for a current regulator in a motor control system of the type wherein motor current is regulated at a given level by varying the voltage output of a controllable voltage supply comprising:
    (a) means for deriving a signal from the current drawing by said motor;
    (b) means responsive to the occurrence of an event for developing an open-loop rate signal, the rate signal exhibiting a predetermined time constant and a magnitude corresponding to the difference between the magnitude of the motor current signal at the occurrence of the event and a preselected magnitude; and
    (c) means for summing said open-loop rate signal with said motor current signal to provide a feedback signal at the preselected magnitude which causes a predetermined degree of regulation of the motor current.

3. A control circuit for varying a feedback signal which is an input for a current regulator in a motor control system of the type wherein motor current is regulated at a given level by varying the voltage output of a controllable voltage supply whose voltage limits are changed as a step function, comprising:
    (a) a resistance-capacitance timing circuit;
    (b) means responsive to the beginning of an event for initiating the charging of the capacitance of said timing circuit;
    (c) means for deriving a motor current signal voltage from the motor current;
    (d) means for summing the motor current signal voltage with the voltage appearing at said capacitance to provide a feedback signal;
    (e) means operative to terminate the charging of said capacitance when said feedback signal reaches a preselected value which causes a predetermined degree of regulation of the motor current;
    (f) and means operative at the end of said event for allowing said capacitance to discharge in accordance with the time constant of said timing circuit;

4. A control circuit for varying a feedback signal which is an input for a current regulator in a motor control system of the type wherein motor current is regulated at a given level by varying the voltage output of a controllable voltage supply whose voltage limits are changed as a step function, comprising:
    (a) a resistance-capacitance timing circuit;
    (b) means including a transistor device and a capacitance for developing a control pulse of preselected time duration determined by the charging time of said capacitance through said transistor device, said time being longer than the time required to charge the capacitance of said timing circuit from zero to its highest level;
    (c) means including a second transistor device for supplying the capacitance of said timing circuit with charging current, said second transistor device being provided with a forward bias as long as said first transistor device is conducting;
    (d) means for deriving a motor current signal voltage from the motor current;
    (e) means for summing the motor current signal voltage with the capacitor voltage to provide a feedback signal;
    (f) means operative to reverse bias said second transistor device when said feedback signal reaches a preselected maximum level which causes a predetermined degree of regulation of the motor current; and
    (g) means operative at cessation of said control pulse for allowing the capacitance of said timing circuit to discharge in accordance with the time constant of said timing circuit.

5. A motor current regulator control comprising:
    (a) a resistance-capacitance timing circuit;
    (b) means for deriving a motor current signal voltage from the motor current;
    (c) means responsive to an external signal for adding a preselected voltage to the motor current signal voltage, the sum of the voltages providing a feedback signal which causes a predetermined degree of regulation of the motor current by controlling the voltage output of the controllable voltage supply;
    (d) means responsive to the external signal for causing the capacitance of said timing circuit to charge;
    (e) and means operative upon cessation of the external signal for removing the preselected voltage and adding the voltage appearing at said capacitance to provide the feedback signal, the cessation of the feedback signal also causing said capacitance to discharge in accordance with the time constant of said timing circuit.

6. A control circuit for varying a feedback signal which is an input for a current regulator in a motor control system of the type wherein motor current is regulated at a given level by varying the voltage output of a controllable voltage supply whose voltage limits are changed as a step function, comprising:
(a) means for deriving a motor current signal voltage from the current drawn by said motor;
(b) first and second transistor devices;
(c) means responsive to an external signal for causing said first transistor device to be rendered conductive for a preselected time period;
(d) means interconnecting said first and second transistor devices so that conduction of said first transistor device is operative to render said second transistor device conductive;
(e) a resistance-capacitance timing circuit;
(f) means coupling the output of said second transistor device to said timing circuit operative to charge the capacitance thereof;
(g) means connecting said capacitance voltage and said motor current signal voltage to a summation means to produce a feedback signal;
(h) means for sensing the magnitude of said feedback signal and being operative to render said second transistor device nonconductive when a preselected magnitude has been reached which causes a predetermined degree of regulation of the motor current;
(i) and means operative when said first transistor device reaches the termination of its conduction period for discharging said capacitance at a controlled rate in accordance with the time constant of said timing circuit.

7. In a motor control system of the type wherein a selected parameter of a motor control system comprising controlled motor means having armature windings and an armature circuit and comprising a regulator is regulated by varying the voltage applied by said armature circuit to said armature windings of said motor means, the voltage limits of the voltage applied by said armature circuit being changed as a step function, the improvement comprising a circuit for controlling a feedback signal which is an input for said regulator comprising in combination:
(a) means responsive to the occurrence of an event in the control of said motor means for developing an open-loop signal;
(b) means for summing the open-loop signal with a signal derived from the selected parameter to provide the feedback signal;
(c) means comparing the feedback signal with a reference signal for raising the level of the feedback signal to a preselected magnitude which causes a predetermined degree of regulation of the selected parameter regardless of the magnitude of the selected parameter at the time of the event; and
(d) means for reducing the magnitude of said open-loop signal at a controlled rate.

8. In a motor control system of the type wherein a selected parameter of a motor control system comprising controlled motor means having armature windings and an armature circuit and comprising a regulator is regulated by varying the voltage applied by said armature circuit to said armature windings of said motor means, the voltage limits of the voltage applied by said armature circuit being changed as a step function, the improvement comprising a circuit for controlling a feedback signal which is an input for said regulator comprising, in combination:
(a) means for deriving a signal from the preselected parameter of said controlled motor means;
(b) means responsive to the occurrence of an event for developing an open-loop rate signal, the rate signal exhibiting a predetermined time constant and a magnitude corresponding to the difference between the magnitude of the signal derived from the preselected parameter at the occurrence of the event and a preselected magnitude; and
(c) means for summing the open-loop rate signal with the signal derived from the preselected parameter to provide a feedback signal at the preselected magnitude which causes a predetermined degree of regulation of the preselected parameter.

9. In a motor control system of the type wherein a selected parameter of a motor control system comprising controlled motor means having armature windings and an armature circuit and comprising a regulator is regulated by varying the voltage applied by said armature circuit to said armature windings of said motor means, the voltage limits of the voltage applied by said armature circuit being changed as a step function, the improvement comprising a circuit for controlling a feedback signal which is an input for said regulator comprising, in combination:
(a) a resistance-capacitance timing circuit;
(b) means responsive to the beginning of an event for initiating the charging of said capacitance of said timing circuit;
(c) means for deriving a first signal from the preselected parameter of said motor control system;
(d) means for summing the first signal with the voltage appearing at said capacitance to provide a feedback signal;
(e) means operative to terminate the charging of said capacitance when the feedback signal reaches a preselected magnitude which causes a preselected regulation of the preselected parameter; and
(f) means operative at the end of said event for allowing said capacitance to discharge in accordance with the time constant of said timing circuit and said regulator holding the feedback signal substantially constant as said capacitance discharges to allow the time constant of said timing circuit to limit the maximum rate at which the motor current can increase.

References Cited
UNITED STATES PATENTS

| | | | |
|---|---|---|---|
| 3,108,214 | 10/1963 | Wilkerson | 318—434 X |
| 3,117,264 | 1/1964 | Smith | 318—52 X |
| 3,183,422 | 5/1965 | Stamm | 318—144 X |
| 3,305,720 | 2/1967 | Safar | 318—434 |

ORIS L. RADER, *Primary Examiner.*

G. SIMMONS, *Assistant Examiner.*